US011098627B2

(12) United States Patent
Yudanov et al.

(10) Patent No.: US 11,098,627 B2
(45) Date of Patent: Aug. 24, 2021

(54) COMPRESSED AIR PURGING ARRANGEMENT FOR AN EXHAUST GAS AFTERTREATMENT SYSTEM

(71) Applicant: VOLVO TRUCK CORPORATION, Gothenburg (SE)

(72) Inventors: Sergi Yudanov, Västra Frölunda (SE); Pramås Martin, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/462,302

(22) PCT Filed: Nov. 17, 2017

(86) PCT No.: PCT/EP2017/079623
§ 371 (c)(1),
(2) Date: May 20, 2019

(87) PCT Pub. No.: WO2018/095818
PCT Pub. Date: May 31, 2018

(65) Prior Publication Data
US 2019/0323399 A1    Oct. 24, 2019

(30) Foreign Application Priority Data
Nov. 22, 2016  (EP) .................. 16199994.1

(51) Int. Cl.
*F01N 3/20* (2006.01)
*B01D 53/94* (2006.01)
(Continued)

(52) U.S. Cl.
CPC ......... *F01N 3/208* (2013.01); *B01D 53/9418* (2013.01); *F01N 3/30* (2013.01);
(Continued)

(58) Field of Classification Search
CPC ..... F01N 2610/1493; F01N 3/206–208; F01N 3/30–34; B01D 53/9418
See application file for complete search history.

(56) References Cited

U.S. PATENT DOCUMENTS

| 9,719,395 B2 * | 8/2017 | Overhoff ................. F01N 3/208 |
| 2008/0148716 A1 * | 6/2008 | Nishibu ................ F01N 3/2066 |
| | | 60/295 |

(Continued)

FOREIGN PATENT DOCUMENTS

| DE | 19946902 A1 | 4/2001 |
| DE | 102011077946 A1 | 12/2012 |

(Continued)

OTHER PUBLICATIONS

International Search Report dated Feb. 1, 2018 in International Application No. PCT/EP2017/079623.

(Continued)

*Primary Examiner* — Laert Dounis
(74) *Attorney, Agent, or Firm* — Venable LLP; Jeffri A. Kaminski

(57) ABSTRACT

Arrangement (100) for an exhaust gas aftertreatment system (102), comprising a tank (104) for storing a reducing agent (106); a pump unit arrangement (108) arranged in downstream fluid communication with the tank; a nozzle (110) arranged to inject a flow of reducing agent into the exhaust gas aftertreatment system (102), the nozzle being arranged in downstream fluid communication with the tank, via the pump unit arrangement, by means of a reducing agent conduit (112); an air conduit (114) arranged in fluid communication with the nozzle (110) for delivery of compressed
(Continued)

air to the nozzle; and a return conduit (116) arranged in fluid communication between the reducing agent conduit and the tank, the return conduit comprising a return conduit valve arrangement (118), wherein the air conduit (114) is arranged in fluid communication with the reducing agent conduit (112) for controllably delivery of reducing agent to the tank via the return conduit valve arrangement (118) by means of providing compressed air from the air conduit to the reducing agent conduit.

12 Claims, 5 Drawing Sheets

(51) Int. Cl.
    *F01N 3/30*   (2006.01)
    *F01N 9/00*   (2006.01)
(52) U.S. Cl.
    CPC ............ *F01N 9/00* (2013.01); *B01D 2258/01* (2013.01); *F01N 2610/02* (2013.01); *F01N 2610/085* (2013.01); *F01N 2610/1433* (2013.01); *F01N 2610/1473* (2013.01); *F01N 2610/1486* (2013.01); *F01N 2610/1493* (2013.01); *F01N 2900/1808* (2013.01)

(56) References Cited

U.S. PATENT DOCUMENTS

| | | | |
|---|---|---|---|
| 2008/0282681 A1* | 11/2008 | Katou | F01N 11/00 60/286 |
| 2009/0101656 A1 | 4/2009 | Leonard | |
| 2010/0122521 A1* | 5/2010 | Sun | F01N 3/208 60/284 |
| 2010/0212290 A1* | 8/2010 | Thiagarajan | F01N 3/2066 60/274 |
| 2015/0047326 A1* | 2/2015 | Gardner | F01N 3/208 60/274 |
| 2016/0040575 A1* | 2/2016 | Zhang | F01N 3/208 60/274 |
| 2017/0082002 A1* | 3/2017 | Ge | F01N 3/36 |

FOREIGN PATENT DOCUMENTS

| | | | | |
|---|---|---|---|---|
| JP | H0615815 B2 * | 3/1994 | | |
| WO | WO-2004047963 A1 * | 6/2004 | ......... | B01D 53/9431 |
| WO | 2014143851 A1 | 9/2014 | | |

OTHER PUBLICATIONS

International Preliminary Report on Patentability dated Dec. 19, 2018 in International Application No. PCT/EP2017/079623.

* cited by examiner

COMPRESSED AIR PURGING ARRANGEMENT FOR AN EXHAUST GAS AFTERTREATMENT SYSTEM

TECHNICAL FIELD

The present invention relates to an arrangement for an exhaust aftertreatment system. The invention also relates to a method of controlling flow of reducing agent in an arrangement for an exhaust gas aftertreatment system. The invention is applicable on vehicles, in particularly low, medium and heavy duty vehicles commonly referred to as trucks, although other type of vehicles using a reducing agent to the exhaust gases also may use the inventive arrangement and method.

BACKGROUND

In connection to exhaust gas aftertreatment of exhaust gases from internal combustion engines, selective catalytic reduction systems (SCR) are often used. These systems use a liquid reducing agent such as e.g. an aqueous ammonia, urea, etc. Hereby, the reducing agent is injected into the SCR by means of a nozzle or the like. A chemical reaction is provided between the exhaust gases from the engine and the reducing agent which reduces the amount of $NO_x$ finally exhausted from the aftertreatment system.

The reducing agent is often provided from a separate tank comprising such liquid compounds. A suitable arrangement comprising a pump and conduits is preferably provided for being able to controllably provide the reducing agent from the tank to the exhaust gas aftertreatment system.

A problem with arrangements for reducing agents such as e.g. aqueous ammonia and urea is that the freezing temperature for these reducing agents is relatively high. Hereby, when delivery of the reducing agent ceases and engine and vehicle are stopped, reducing agent still present in the arrangement is at risk of freezing. Prior art arrangements try to solve this problem in various manners. However, the arrangements are in need of further improvement. Another problem with prior art arrangements for reducing agent delivery is solid deposits that may form and remain throughout parts of the systems when the system is temporarily inoperative, which deposits may disturb operation of the reducing agent delivery during subsequent operations.

US 2010/0122521 relates to a urea dosing system, and more particular to a method for purging a urea dosing system. WO 2014/143851 relates to an apparatus for priming a diesel exhaust fluid injection pump. DE 199 46 902 relates to a device for subsequently treating exhaust gases of an internal combustion engine. US 2009/0101656 relates to a system for storing an additive and for injecting the additive into exhaust gases of an internal combustion engine. DE10 2011 077946 relates to a conveying device which has a dosing and injection module (10), where a pump (8) is formed to promote an operating fluid (2) from a reservoir (4) to the dosing and injection module.

There is thus a need to provide an arrangement which improves the removal of the reducing agent after use to avoid freezing and solid deposit damages thereof.

SUMMARY

It is an object of the present invention to provide an arrangement for an exhaust gas aftertreatment system which at least partially improves the removal of reducing agent after use thereof in comparison to the prior art. The object is at least partly achieved by a method according to claim 1.

According to a first aspect of the present invention, there is provided an arrangement for an exhaust gas aftertreatment system, the arrangement comprising a tank for storing a reducing agent; a pump unit arrangement arranged in downstream fluid communication with the tank; a nozzle arranged to inject a flow of reducing agent into the exhaust gas aftertreatment system, the nozzle being arranged in downstream fluid communication with the tank, via the pump unit arrangement, by means of a reducing agent conduit; an air conduit arranged in fluid communication with the nozzle for delivery of compressed air to the nozzle; and a return conduit arranged in fluid communication between the reducing agent conduit and the tank, the return conduit comprising a return conduit valve arrangement, wherein the air conduit is arranged in fluid communication with the reducing agent conduit for controllably delivery of reducing agent to the tank via the return conduit valve arrangement by means of providing compressed air from the air conduit to the reducing agent conduit.

The wording "reducing agent" should be understood to mean an element that is used in a reduction process. In the reduction process, the reducing agent loses electron(s) and is said to have been oxidized. Various types of reducing agents can be used and the present invention should not be construed as limited to any specific kind. However, as a non-limiting example, the reducing agent may be a water-based urea solution which is provided into the exhaust gas aftertreatment system. Other alternatives are of course conceivable, such as e.g. an aqueous ammonia, anhydrous ammonia, etc.

Moreover, the wording "in fluid communication" should be construed as being valid for e.g. liquids as well as gases, such as the above described compressed air. Hence, fluid communication should be understood to mean that a liquid or a gas can be delivered to the specific component. According to the above description, the compressed air has a conduit to the nozzle which is the fluid communication.

An advantage is that a return conduit is provided to the tank for purging of the arrangement. Hereby, after use, i.e. after reducing agent has been delivered to the exhaust gas aftertreatment system, remaining reducing agent in the reducing agent conduit can be purged back to the tank. As the air conduit is arranged in fluid communication with the reducing agent conduit, the pressure of the compressed air can be controlled, in conjunction with the return conduit valve arrangement, such that reducing agent is delivered back to the tank only when desirable, as also described below. Accordingly, reducing agent is controllably returned to the tank. The reducing agent can thereafter be used for provision to the exhaust gas aftertreatment system.

Furthermore, as purging of the arrangement can be made to the tank, i.e. at a position upstream the nozzle, a reduced amount of compressed air is needed in comparison to an alternative where compressed air purges all the reducing agent out through the nozzle. Hereby, the overall control of providing reducing agent to the exhaust gas aftertreatment system can be improved due to less uncontrolled injection during purging.

A still further advantage is that removal of reducing agent wall film in the conduits close to the nozzle is improved as less wall film is needed to be purged though the nozzle, which reduces the risk of blocking the nozzle. Also, the vehicle's overall fuel consumption can be reduced as the purging process will require less compressed air from the vehicle's pneumatic system.

According to an example embodiment, the return conduit valve arrangement may be controllable between a first state in which reducing agent is prevented from flowing back to the tank and a second state in which at least portions of the reducing agent positioned upstream the nozzle in the reducing agent conduit is directed to the tank, wherein the return conduit valve arrangement is controllable to be switched from the first state to the second state when the pressure level in the return conduit upstream the return conduit valve arrangement exceeds a predetermined threshold limit.

Hereby, purging of reducing agent back to the tank is controlled by controlling the pressure level of the compressed air. The predetermined threshold limit may vary depending on the specific application of use and the specific type of valves used. According to a non-limiting example, the predetermined threshold limit may be between 3-6 bar, such as preferably around 4 bar.

According to an example embodiment, the pump unit arrangement may comprise a pump assembly in the reducing agent conduit, the pump assembly comprising a pump and an overflow valve, wherein the overflow valve is connected in parallel to the pump.

Hereby, if the pressure level in the reducing agent conduit is too high, the overflow valve can redirect reducing agent back to the inlet side of the pump. Such overflow valve is usually utilized to protect the hydraulic circuit downstream the pump from excessive pressures in case of accidental component breakdown or blocking of that circuit, and are consequently not used for performing flow control tasks.

According to an example embodiment, the return conduit valve arrangement and the overflow valve may be respective pressure controlled relief valves, wherein the return conduit valve arrangement is arranged to be positioned in an open state at a pressure level lower than the pressure level at which the overflow valve is positioned in an open state.

The wording "relief valve" should be understood to mean a valve which is arranged to be positioned in an opened state when a pressure level exerted thereon is exceeding a predetermined limit. The relief valve may also be a one-way valve which only allows fluids to be delivered there through in one direction and prevents their delivery in the opposite direction.

Hereby, the overflow valve is only opened at high pressure levels, while the return conduit valve arrangement is opened more frequently when purging the arrangement.

According to an example embodiment, the return conduit may be connected to the reducing agent conduit at a position inside the pump unit arrangement.

Hereby, the number of hydraulic fittings can be reduced and the total length of the reducing agent conduit may be reduced. Thus, a reduced cost for the arrangement may be achieved.

According to an example embodiment, the arrangement may further comprise a first air valve arrangement, the air conduit being arranged in fluid communication with the reducing agent conduit via the first air valve arrangement.

Hereby, the volume of the arrangement positioned upstream the first air valve arrangement can be purged back to the tank. Accordingly, by positioning the first air valve arrangement in the vicinity of the nozzle, preferably outside the pump unit as described below, only the volume in the vicinity of the nozzle is purged out through the nozzle. According to a non-limiting example, the first air valve arrangement may be positioned between a few millimeters up to a meter from the nozzle. Any position there between should be construed as being in the vicinity of the nozzle. Preferably, the distance may be approximately 100 mm. Reducing agent which may be kept in e.g. pockets in the conduits upstream the first air valve arrangement would then be purged to the tank. Also, reducing agent film that may adhere to the inner surfaces of these conduits would also be removed by purging the volume upstream the air valve arrangement to the tank. This is advantageous because this back-to-tank purging is far less demanding with regards to allowable residual volume of reducing agent, compared to the forward through-nozzle purging. Hereby, a shorter purging duration and a lower air flow would be necessary to achieve sufficient degree of purging in the case of the back-to-tank purging.

Moreover, positioning the first air valve arrangement in the close vicinity of the nozzle also enables for a more suitable and frequent "on-the-run" purging of the arrangement as a minimized volume is purged through the nozzle thus keeping the unproductive loss of reducing agent low. Hereby, the nozzle is kept relatively clean as the reducing agent purged out of the arrangement is taken away from the nozzle by the exhaust gas stream.

According to an example embodiment, the first air valve arrangement may be arranged at a position inside the pump unit arrangement. A more cost efficient arrangement may hereby be provided.

According to an example embodiment, the first air valve arrangement may be arranged at a position outside the pump unit arrangement between the pump unit arrangement and the nozzle.

Hereby, and as described above, only the relatively small volume in the vicinity of the nozzle is purged out through the nozzle. Accordingly, the nozzle can be kept relatively clean.

According to an example embodiment, the arrangement may further comprise an electrically controlled reducing agent valve arrangement arranged in the reducing agent conduit between the return conduit and the nozzle.

The electrically controlled reducing agent valve arrangement may be controlled by a suitable system or control unit of the vehicle. An advantage is that by positioning the electrically controlled reducing agent valve arrangement in the closed state while providing compressed air, the reducing agent will be purged from the section of the reducing agent conduit upstream of the return conduit back to the tank, thus reducing the volume of the reducing agent that would, upon re-opening of the electrically controlled reducing agent valve arrangement, have to be purged through the nozzle.

According to an example embodiment, the arrangement may further comprise an air conduit valve arranged in the air conduit. The air conduit valve may be electrically controlled.

Hereby, an air pressure can be built up in the air conduit by means of positioning the air conduit valve in the closed state. The air conduit valve can thus be used for a more controllable delivery of compressed air to the nozzle. Also, by increasing the pressure in the air conduit to a pressure level exceeding the pressure level at which the first air valve arrangement is positioned in the opened state will thus also provide compressed air to the reducing agent conduit. Hence, the air conduit valve can control the pressure levels in the system for purging reducing agent to the tank whilst preventing outflow of compressed air via nozzle, which makes it possible to reduce the volume of compressed air required for the purging process.

According to an example embodiment, the air conduit valve may be positioned between the first air valve arrangement and the nozzle.

According to an example embodiment, the air conduit valve may be arranged at a position in the vicinity of the nozzle outside the pump unit arrangement.

Similarly to the above description, positioning the air conduit valve in the vicinity of the nozzle will improve purging of reducing agent to the tank and only a minimum amount of reducing agent needs to be purged through the nozzle, keeping it relatively clean. According to a non-limiting example, the air conduit valve may be positioned between a few millimeters up to a meter from the nozzle. Any position there between should be construed as being in the vicinity of the nozzle. Preferably, the distance may be approximately 100 mm.

According to an example embodiment, the return conduit may be arranged in direct fluid communication with the tank. Hereby, possible appearances of air pockets at the inlet side of the pump unit may be avoided. Such air pockets usually increase the time necessary to re-establish proper functioning of the pump unit and the dosing system as a whole when delivery of the reducing agent to the exhaust system needs to resume.

According to an example embodiment, the return conduit may be arranged in fluid communication with the tank via a pump unit inlet side of the reducing agent conduit.

Hereby, the return conduit can be connected to already existing conduits of the arrangement, i.e. no separate conduit into the tank is necessary.

According to a second aspect of the present invention, there is provided a method of controlling flow of reducing agent in an arrangement for an exhaust gas aftertreatment system of an engine, the arrangement comprising a tank, a reducing agent conduit connected to a nozzle for delivery of reducing agent to the exhaust gas aftertreatment system, an air conduit arranged in fluid communication with the nozzle for delivery of compressed air thereto, a first air valve arrangement arranged in fluid communication between the air conduit and the reducing agent conduit, and a return conduit arranged in fluid communication with the reducing agent conduit and the tank, the return conduit comprising a pressure controlled return conduit valve arrangement for controllably delivery of reducing agent to the tank, the method comprising the steps of providing reducing agent from the tank into the reducing agent conduit; providing compressed air to the air conduit when reducing agent is provided into the reducing agent conduit, the compressed air being provided at a first pressure level; providing compressed air at a second pressure level after cessation of providing reducing agent into the reducing agent conduit, wherein the second pressure level is higher than the first pressure level; and providing compressed air at a third pressure level when receiving a signal indicative of engine shut-down, the third pressure level being equal to or higher than the second pressure level.

Hereby, an efficient method may be provided for purging reducing agent back to the tank. The method is thus beneficially using air pressure levels of the compressed air for purging the arrangement in such a way that major part of the reducing agent is purged back to tank and only a minor part is displaced out of the nozzle. Hereby, the purging becomes easier and could then be performed during a shorter period of time. This opens up for a further advantageous opportunity of executing purging more frequently and upon each occasion of cessation of delivery of the reducing agent. Having the arrangement configured in this way, the majority of the purging events would occur at times when there is still a flow of exhaust gas through the exhaust gas aftertreatment system, which reduces the risk that reducing agent condensate is depositing back to the nozzle. Applying selectively the second or third pressure levels allows the selection of the on-the-run purge as described above, or a complete purge for avoiding possible frost damage of the system, the complete purge being realized at the third pressure level when the reducing agent is displaced out of the reducing agent conduit back to tank.

According to an example embodiment, the first air valve arrangement may be arranged to be positioned in an open state at the second pressure level and the return conduit valve arrangement may be arranged to be positioned in an open state at the third pressure level.

According to an example embodiment, an air conduit valve arrangement may be positioned in the air conduit upstream the nozzle; wherein the method further comprises the step of positioning the air conduit valve arrangement in a closed state when providing compressed air at a pressure level higher than the first pressure level. This allows for an on-the-run, or partial purged, to be performed with a reduced air flow consumption, since the air flow is limited only to the reducing agent conduit in the beginning of the process.

According to an example embodiment, the method may further comprise the step of positioning the air conduit valve arrangement in an opened state for providing compressed air to the nozzle at a pressure level corresponding at least to the first pressure level. Hereby, purging and final cleaning of the nozzle via both the air conduit and the reducing air conduit is provided.

According to an example embodiment, a reducing agent valve arrangement may be arranged in the reducing agent conduit between the return conduit and the nozzle, the method further comprising the step of positioning the reducing agent valve arrangement in a closed state when providing compressed air at a pressure level higher than the first pressure level, for at least a part of the time when air pressure higher than the first pressure level is applied.

Further effects and features of the second aspect are largely analogous to those described above in relation to the first aspect.

According to a third aspect of the present invention, there is provided a vehicle comprising an internal combustion engine and an exhaust gas aftertreatment system arranged downstream the internal combustion engine, wherein the vehicle further comprises an arrangement according to any of the example embodiments described above in relation to the first aspect, the arrangement being arranged to provide reducing agent to the exhaust gas aftertreatment system via the nozzle.

Effects and features of the third aspect are largely analogous to those described above in relation to the first and second aspects.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

Figure 1:
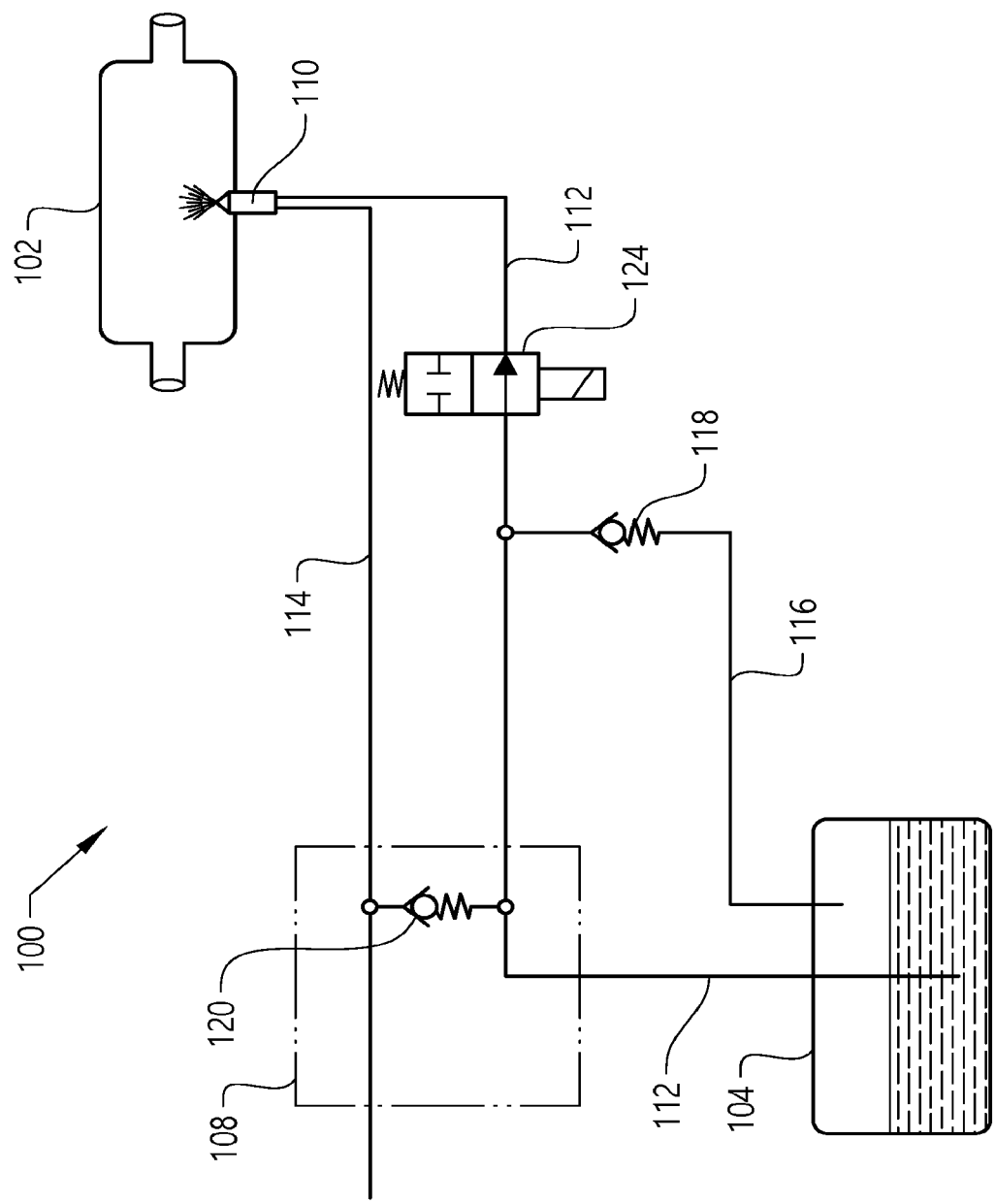
FIG. 1 is a schematic view of an arrangement for an exhaust gas aftertreatment system according to an example embodiment of the present invention.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is depicted an arrangement 100 for an exhaust gas aftertreatment system 102 according to an example embodiment of the present invention. The arrangement 100 is adapted to contain and distribute a reducing agent to the exhaust gas aftertreatment system 102 for reduction of $NO_x$ gases therefrom.

Figure 2:
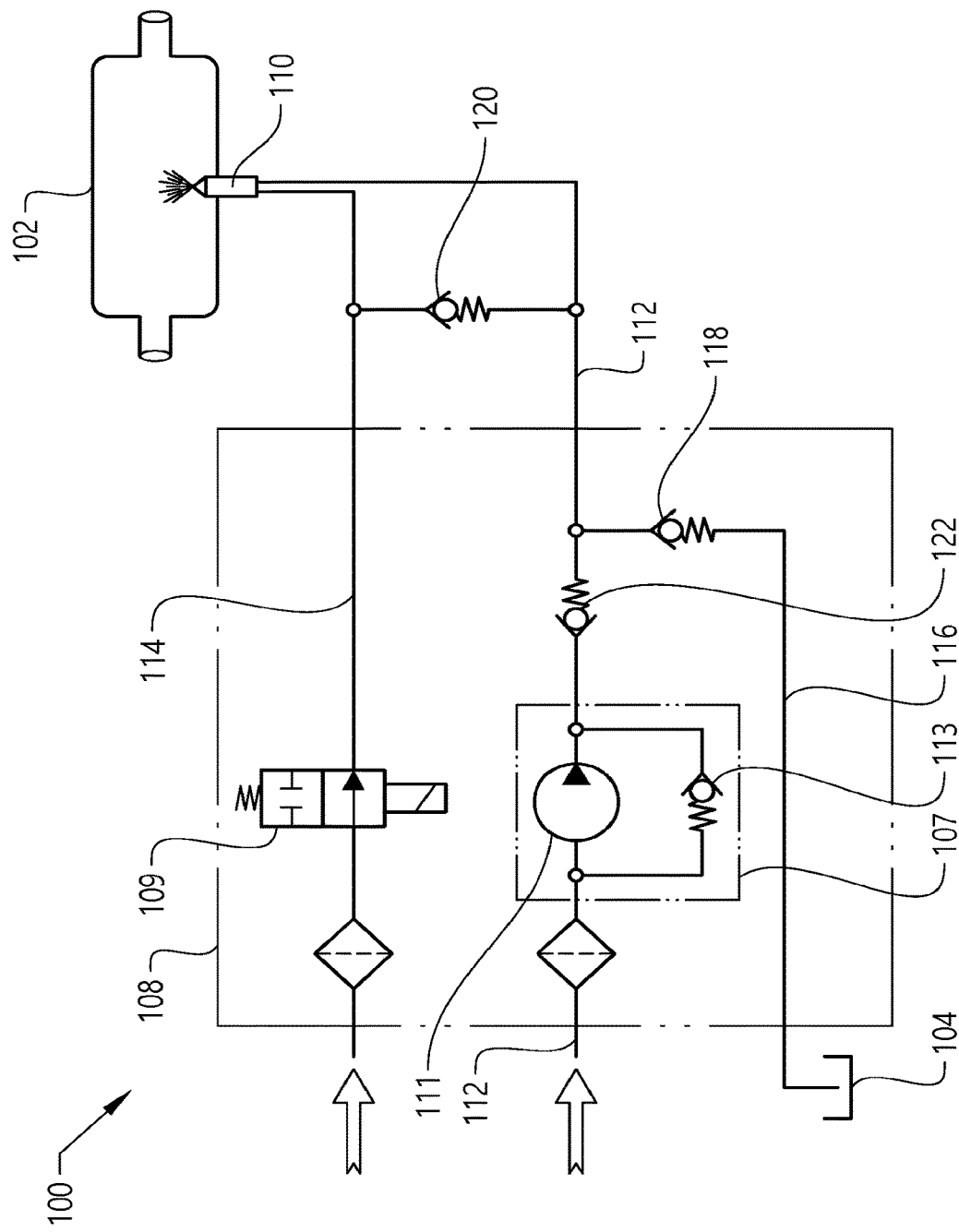
FIG. 2 is a schematic view of an arrangement according to another example embodiment of the present invention.
Figure 3:
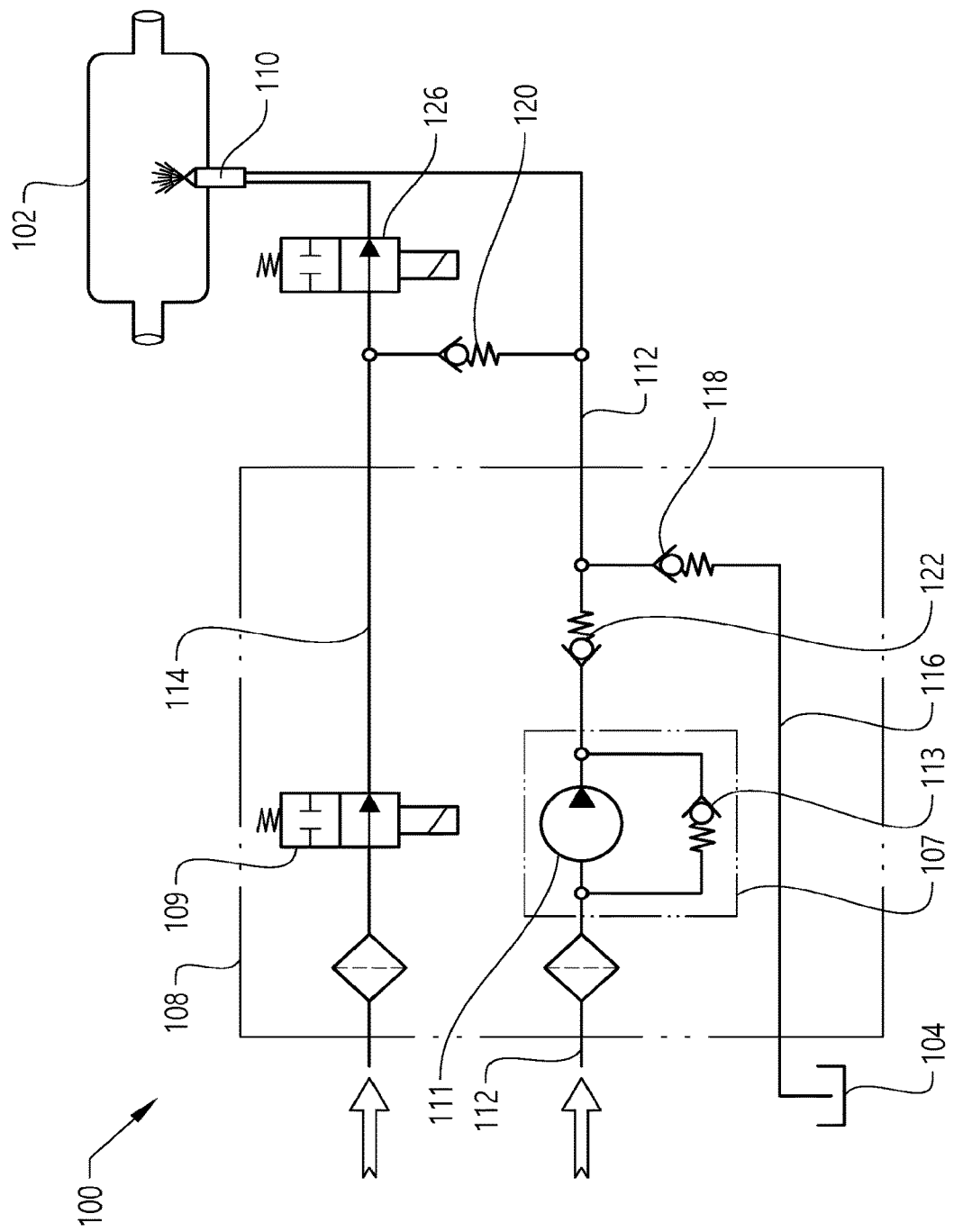
FIG. 3 is a schematic view of an arrangement according to a further example embodiment of the present invention.
Figure 4:
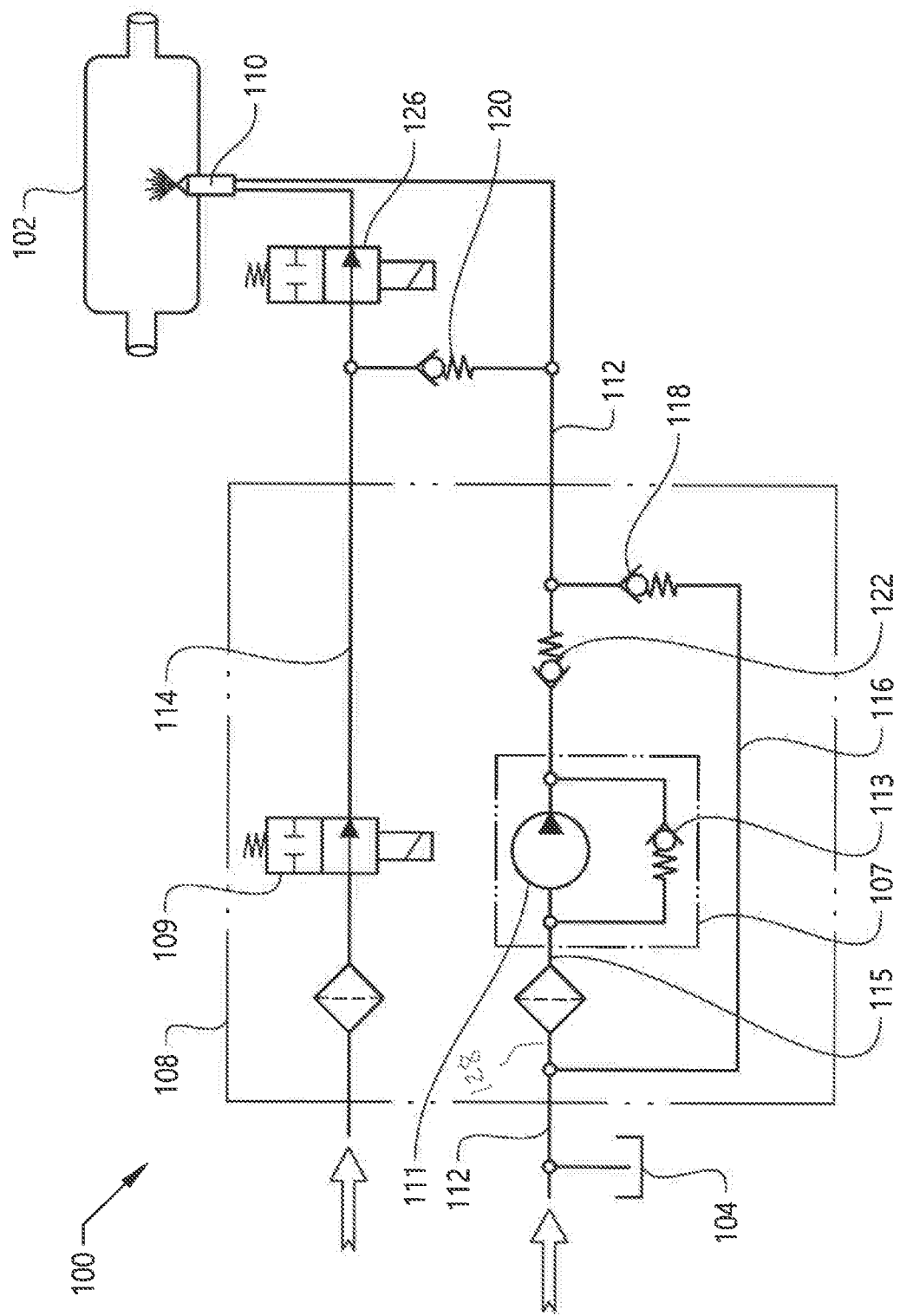
FIG. 4 is a schematic view of an arrangement according to a still further example embodiment of the present invention.

As depicted in FIG. 1, the arrangement 100 comprises a tank 104 containing the reducing agent. The tank 104 is arranged in fluid communication with a nozzle 110 which is arranged to distribute the reducing agent to the exhaust gas aftertreatment system 102. The tank 104 is in fluid communication with the nozzle 110 by means of a reducing agent conduit 112. The reducing agent conduit 112 is in turn provided through a pump unit arrangement 108 comprising a pump (111 in FIGS. 2-4) for increasing the pressure level of the reducing agent delivered from the tank 104. The pump 111 also pressurizes the reducing agent for being able to deliver the reducing agent to the nozzle 110 with a sufficient pressure. Examples of how the pump unit arrangement 108 can be configured is depicted in FIGS. 2-4 and described further below. Hence, the pump unit arrangement 108 in FIG. 1 can be designed and function as the depicted pump unit arrangement in FIGS. 2-4.

Moreover, the arrangement further comprises an air conduit 114 arranged in fluid communication with the nozzle 110. The air conduit 114 is arranged to supply compressed air to the nozzle 110 for providing a mist of reducing agent and compressed air into the exhaust gas aftertreatment system 102. In FIG. 1, the air conduit 114 is arranged between the pump unit arrangement 108 and the nozzle 110. This configuration serves as one possible configuration and it should be readily understood that the air conduit 114 may be arranged in fluid communication between the nozzle 110 and a pressure storage tank (not shown) or the like. Accordingly, the air conduit 114 must not necessarily be connected through the pump unit arrangement 108. Preferably, the air conduit 114 is connected to a pneumatic compression tank of the vehicle via suitable pressure/flow control means for being able to deliver compressed air at various pressure levels to the air conduit 114.

Furthermore, the air conduit 114 is arranged in fluid communication with the reducing agent conduit 112 for supply of compressed air to the reducing agent conduit 112. As depicted in FIG. 1, the air conduit 114 is arranged in fluid communication with the reducing agent conduit 112 via a first air valve arrangement 120. The first air valve arrangement 120 can be positioned within the pump unit arrangement 108 as illustrated in FIG. 1, or positioned outside the pump unit arrangement 108. The first air valve arrangement 120 is preferably a pressure relief valve arranged to be positioned in an opened state when the pressure level in the air conduit 114 exceeds a predetermined limit. The predetermined limit for the first air valve arrangement 120 may, according to non-limiting examples, be between 2-5 bar, such as preferably approximately 3 bar or more preferable approximately 2.9 bar. Also, the first air valve arrangement 120 may be a one-way valve which only allows flow from the air conduit 114 to the reducing agent conduit 112 and not in the opposite direction.

Still further, the arrangement 100 comprises a return conduit 116 arranged in fluid communication between the reducing agent conduit 112 and the tank 104. The return conduit 116 further comprises a return conduit valve arrangement 118 positioned between the tank 104 and the reducing agent conduit 112. The return conduit valve arrangement 118 is also preferably a relief valve arrangement configured to be positioned in an opened state when the pressure level in the reducing agent conduit 112 exceeds a predetermined threshold limit. The predetermined threshold limit for the return conduit valve arrangement 118 may, according to non-limiting examples, be between 2-6 bar, such as preferably approximately 4 bar. According to a non-limiting example, the first air valve arrangement 120 may be arranged to be positioned in the opened state at a pressure level which is lower than the pressure level at which the return conduit valve arrangement 118 is arranged to be positioned in the opened state. Hereby, it is possible to control the air pressure in the air conduit 114 such that the first air valve arrangement 120 is positioned in the opened state. Thereafter, the pressure level can be increased such that also the return conduit valve arrangement 118 is positioned in the opened state.

By means of the first air valve arrangement 120 and the return conduit valve arrangement 118, the arrangement 100 can be purged such that reducing agent which is present in the reducing agent conduit 112 after use can be forced back to the tank 104 as well as out through the nozzle 110.

Finally, the arrangement 100 depicted in FIG. 1 also comprises a reducing agent valve arrangement 124 positioned in the reducing agent conduit 112 downstream the intersection between the reducing agent conduit 112 and the return conduit 116. Accordingly, the reducing agent valve arrangement 124 is positioned in fluid communication between the return conduit 116 and the nozzle 110. The reducing agent valve arrangement 124 is preferably an electronically controlled valve which receives control signals from a control unit (not shown) of the vehicle. By positioning the reducing agent valve arrangement 124 in a closed state, reducing agent from parts of the reducing agent conduit 112 upstream the reducing agent valve arrangement 124 is prevented from reaching the nozzle 110. Increasing the pressure level in the reducing agent conduit 112 opening pressure of the first air valve 120 and the return conduit valve arrangement 118, while keeping the reducing agent valve arrangement 124 closed would purge the section of the reducing agent conduit 112 arranged between the first air valve arrangement 120 and the return conduit valve arrangement 118 back to the tank 104. This allows for a reduction of the total volume of reducing agent that would have to be purged out of the nozzle upon re-opening of the reducing agent valve arrangement 124.

Turning now to FIG. 2 which illustrates another example embodiment of the arrangement for the exhaust gas aftertreatment system. Features which are similar to those described above in relation to FIG. 1 will not be described in further detail.

As depicted in FIG. 2, the first air valve arrangement 120 is arranged between the air conduit 114 and the reducing agent conduit 112 at a position outside the pump unit arrangement 108. Hereby, the first air valve arrangement 120 is arranged between the pump unit arrangement 108 and the nozzle 110. Further, the first air valve arrangement 120 is arranged in the vicinity of the nozzle 110. According to a non-limiting example, the first air valve arrangement 120 may be positioned approximately 100 mm from the nozzle 110. The first air valve arrangement 120 may for example also be positioned at any position between a few millimeters up to a meter from the nozzle. An advantage of positioning the first air valve arrangement 120 in the vicinity of the nozzle 110 is that a relatively small volume needs to be purged through the nozzle 110 while a majority is purged through the return conduit back to the tank 104.

Furthermore, the arrangement 100 depicted in FIG. 2 comprises a second air valve arrangement 109 positioned in the air conduit 114. Hereby, the second air valve arrangement 109 may be used for controlling supply of compressed air to the air conduit 114.

Still further, the pump unit arrangement 108 comprises a pump assembly 107 comprising a pump 111 and an overflow valve 113. The pump 111 is, as described above, arranged to increase the pressure level of the reducing agent delivered from the tank 104. The overflow valve 113 is preferably a relief valve which is arranged to be positioned in an opened state when the pressure level in the reducing agent conduit downstream the pump 111 exceeds a predetermined threshold limit. Such predetermined limit for the overflow valve may, according to a non-limiting example, be above approximately 15 bar. The pressure level at which the overflow valve is positioned in the opened state is preferably higher than the pressure level at which the return conduit valve arrangement 118 is positioned in the opened state. Hereby, the overflow valve 113 is mainly intended as a security valve for reducing the risk of having too high pressure, i.e. pressure spikes, downstream the pump 111. The overflow valve 113 is thus preferably bypassing the pump 111 and is connected in parallel with the pump 111.

Moreover, the return conduit 116 is in the embodiment depicted in FIG. 2 connected to the reducing agent conduit 112 at a position within the pump unit arrangement 108. Also, the arrangement 100 comprises a one-way valve 122 downstream the pump assembly 107. Hereby, reducing agent is prevented from flowing into the outlet of the pump 111, i.e. in the wrong direction of the pump 111.

The arrangement 100 further comprises a filter positioned upstream the pump assembly 107 in the reducing agent conduit 112 and a filter positioned upstream the second air valve arrangement 109 in the air conduit 114. The filters are illustrated by squares in the Figures.

Turning now to FIG. 3 which illustrates yet another example embodiment of the arrangement for the exhaust gas aftertreatment system. The difference between the embodiment in FIG. 3 in comparison to the embodiment depicted in FIG. 2 is that the arrangement illustrated in FIG. 3 further comprises an air conduit valve 126 positioned in the air conduit 114. The air conduit valve 126 is preferably an electrically controlled valve which is connected to, and controlled by, a control unit of the vehicle. The air conduit valve 126 is positioned in fluid communication between the first air valve arrangement 120 and the nozzle 110. Hereby, the air conduit valve 126 can be arranged in a closed state such that no compressed air is directed to the nozzle 110 via the air conduit 114. At the same time, the air pressure upstream the air conduit valve 126 is increased such that the first air valve arrangement 120 eventually will be arranged in the opened state to allow compressed air to be directed to the reducing agent conduit 112. Hereby, the compressed air will force the reducing agent through the return conduit and back to the tank 104, thus sufficiently purging the arrangement 100.

Turning now to FIG. 4 which illustrates a still further example embodiment of the arrangement for the exhaust gas aftertreatment system. The difference between the arrangement depicted in FIG. 4 and the arrangement depicted in FIG. 3 is that the return conduit 116 is not directly connected to the tank 104 in the embodiment depicted in FIG. 4. Rather, the return conduit 116 is in FIG. 4 arranged in fluid communication between the reducing agent conduit 112 and the tank 104 via an inlet side 115 of the pump assembly 107. Hereby, the flow of reducing agent can be directed from the return conduit back to the tank 104 without requiring any special return conduit and thus keeping complexity and overall costs for the arrangement down.

Furthermore, the embodiment depicted in FIG. 4 may utilize means of controlling the quantity of the reducing agent that is returned to the tank during a purging event. Such means could constitute a pre-calibrated duration of applying purge air pressure via the first air valve arrangement 120, such that by the end of the purging process only the downstream side of the pump assembly 107 of the reducing agent conduit 112 is emptied and the pump assembly inlet side 115 of the reducing agent conduit 112 is kept filled up with the reducing agent. Hereby, a reduced response time of the system when delivery of the reducing agent to the exhaust system is provided, due to absence of air pockets upstream the pump assembly 107. Alternatively, such means could involve processing the signal of a pressure sensor (not shown) installed upstream of the return conduit valve arrangement 118 and detecting a glitch that would form upon the flow transition from liquid flow to air flow via the return conduit valve arrangement 118, and ceasing to apply purge air pressure following such a detection. The glitch formation would effectively occur on the flow restriction of the opening of the return conduit valve arrangement 118, but if so desired an additional flow restriction (not shown) may be placed along the return conduit 116 for the glitch to occur at flow transition across the restriction instead of the return the return conduit valve arrangement 118, if that is found beneficial for the function.

Figure 5:
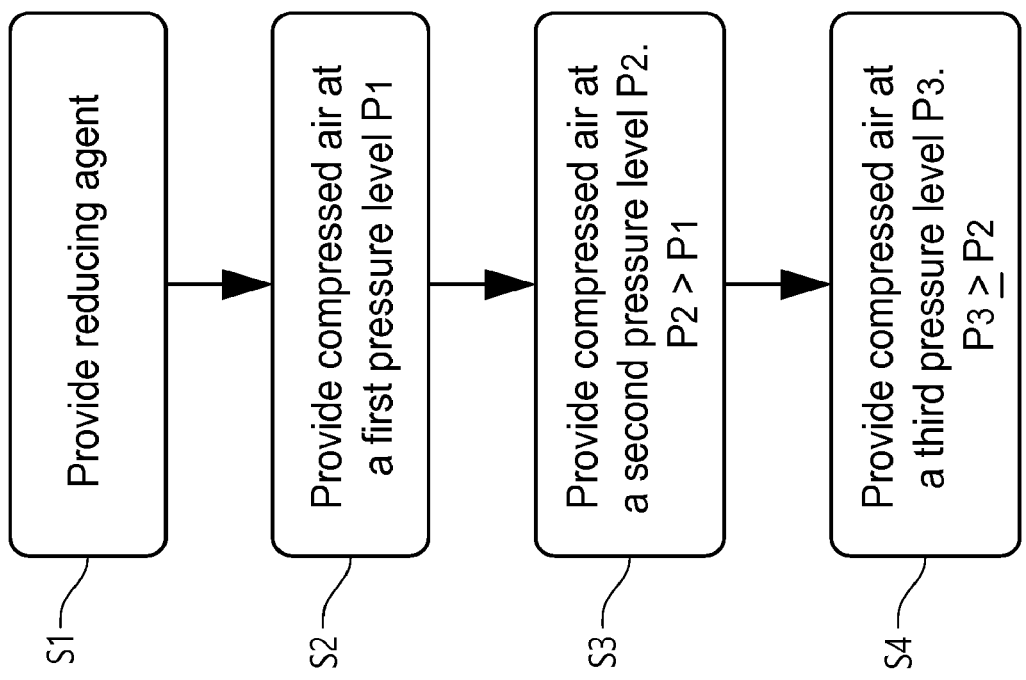
FIG. 5 is an example embodiment of a flow chart of a method for controlling flow of reducing agent in any of the arrangements in FIGS. 1-4.

Finally, reference is made to FIG. 5 which illustrates an example embodiment of a flow chart of a method for controlling flow of reducing agent in any of the arrangements in FIGS. 1-4.

Firstly, reducing agent is provided S1 from the tank 104 to the reducing agent conduit 112. Hereby, reducing agent can be supplied to the nozzle 110 and further into the exhaust gas aftertreatment system 102. Also, when the reducing agent is provided into the reducing agent conduit 112, compressed air at a first pressure level P1 is provided S2 to the air conduit 114. Hereby, compressed air is provided to the nozzle 110 for being able to create a mist of compressed air and reducing agent into the exhaust gas aftertreatment system 102. In the embodiment depicted in FIGS. 3 and 4, the air conduit valve 126 is hereby positioned in the opened state.

Thereafter, when reducing agent is no longer provided from the tank to the nozzle, i.e. after cessation of providing reducing agent into the reducing agent conduit 112, compressed air is provided S3 at a second pressure level P2. The second pressure level P2 is preferably higher than the first pressure level P1. At the second pressure level P2, the first air valve arrangement 120 is arranged to be positioned in the opened state for allowing compressed air to be directed from the air conduit 114 and into the reducing agent conduit 112. Furthermore, when providing compressed air at the second pressure level P2, the air conduit valve 126 may be arranged in the closed state. Also, the return conduit valve arrangement 118 is still arranged in the closed state.

When thereafter receiving a signal indicative of engine shut-down, i.e. a signal indicating that the engine is turned off, compressed air is provided S4 at a third pressure level P3, which third pressure level P3 is equal to, or higher than the second pressure level P2. When air is provided at the third pressure level P3, the return conduit valve arrangement 118 is arranged in the opened state. Hereby, reducing agent can be directed back to the tank 104 via the return conduit 116, wherein the relatively small amount of reducing agent located downstream the first air valve arrangement 120 in the reducing agent conduit 112 having been purged into the exhaust gas aftertreatment system 102 via the nozzle 110 at S4.

At an alternative further step of the method, the air conduit valve 126 may be re-opened whilst reducing agent is not supplied to the reducing agent conduit 112 but air pressure is supplied to air conduit 114, in order to effect a final cleaning of the nozzle 110 by compressed air via its both reducing agent and compressed air openings. The re-opening of the air conduit valve 126 may occur either after or during the steps S3 or S4.

It should be readily understood that the features described in the various embodiments above with relation to FIGS. 1-4 can be combined with each other. For example, the reducing agent valve arrangement 124 may be used together with the air conduit valve 126, etc.

Moreover, although not depicted in the figures, an alternative solution may also be to remove the return conduit and the return conduit valve arrangement from the arrangement. The first air valve arrangement 120 and sensors for detecting flow of reducing agent are arranged at a position in the vicinity of the nozzle 110, typically ranging from over 1 m to below few millimeters, but preferably at approximately 100 mm therefrom. Purging is performed by controllably delivery of compressed air to the reducing agent conduit via the first air valve arrangement 120, thus forcing reducing agent out through the nozzle 110. An advantage is that the fill-up control of the system can be improved as the sensor for detecting flow of reducing agent is moved closer to the nozzle.

It is to be understood that the present invention is not limited to the embodiments described above and illustrated in the drawings; rather, the skilled person will recognize that many changes and modifications may be made within the scope of the appended claims.

The invention claimed is:

1. An arrangement for an exhaust gas aftertreatment system, the arrangement comprising:
   a tank for storing a reducing agent;
   a pump unit arrangement arranged in downstream fluid communication with the tank;
   a nozzle arranged to inject a flow of reducing agent into the exhaust gas aftertreatment system, the nozzle being arranged in downstream fluid communication with the tank, via the pump unit arrangement, by means of a reducing agent conduit;
   an air conduit arranged in fluid communication with the nozzle for delivery of compressed air to the nozzle; and
   a return conduit arranged in fluid communication between the reducing agent conduit and the tank, the return conduit comprising a return conduit valve arrangement, wherein the air conduit is arranged in fluid communication with the reducing agent conduit for controllable delivery of reducing agent to the tank via the return conduit valve arrangement by means of providing compressed air, at a first pressure level, from the air conduit to the reducing agent conduit, wherein the arrangement further comprises a first air valve arrangement positioned in the vicinity of the nozzle, the air conduit being arranged in fluid communication with the reducing agent conduit via the first air valve arrangement,
   wherein the arrangement further comprises a reducing agent valve arrangement arranged in the reducing agent conduit between the return conduit and the nozzle, the reducing agent valve arrangement being arranged in a closed state when compressed air is provided to the air conduit at a pressure level higher than the first pressure level.

2. The arrangement according to claim 1, wherein the return conduit valve arrangement is controllable between a first state in which reducing agent is prevented from flowing back to the tank and a second state in which at least portions of the reducing agent positioned upstream the nozzle in the reducing agent conduit is directed to the tank, wherein the return conduit valve arrangement is controllable to be switched from the first state to the second state when the pressure level in the return conduit upstream the return conduit valve arrangement exceeds a predetermined threshold limit.

3. The arrangement according to claim 1, wherein the pump unit arrangement comprises a pump assembly in the reducing agent conduit, the pump assembly comprises a pump and an overflow valve, wherein the overflow valve is connected in parallel to the pump.

4. The arrangement according to claim 3, wherein the return conduit valve arrangement and the overflow valve are respective pressure controlled relief valves, wherein the return conduit valve arrangement is arranged to be positioned in an open state at a pressure level lower than the pressure level at which the overflow valve is positioned in an open state.

5. The arrangement according to claim 1, further comprising an air conduit valve arranged in the air conduit.

6. The arrangement according to claim 5, wherein the air conduit valve is positioned between the first air valve arrangement and the nozzle.

7. The arrangement according to claim 1, wherein the return conduit is arranged in fluid communication with the tank via a pump unit inlet side of the reducing agent conduit.

8. A method of controlling flow of reducing agent in an arrangement for an exhaust gas aftertreatment system of an engine, the arrangement comprising a tank; a reducing agent conduit connected to a nozzle for delivery of reducing agent to the exhaust gas aftertreatment system, an air conduit arranged in fluid communication with the nozzle for delivery of compressed air thereto, a first air valve arrangement arranged in fluid communication between the air conduit and the reducing agent conduit, and a return conduit arranged in fluid communication with the reducing agent conduit and the tank, the return conduit comprising a pressure controlled return conduit valve arrangement for controllable delivery of reducing agent to the tank wherein the first air valve arrangement is positioned in the vicinity of the nozzle, the air conduit being arranged in fluid communication with the reducing agent conduit via the first air valve arrangement, wherein a reducing agent valve arrangement is arranged in the reducing agent conduit between the return conduit and the nozzle, the method comprising the steps of:

providing reducing agent from the tank into the reducing agent conduit;

providing compressed air to the air conduit when reducing agent is provided into the reducing agent conduit, the compressed air being provided at a first pressure level;

providing compressed air at a second pressure level after cessation of providing reducing agent into the reducing agent conduit, wherein the second pressure level is higher than the first pressure level;

positioning the reducing agent valve arrangement in a closed state when providing compressed air at a pressure level higher than the first pressure level, for at least a part of the time when air pressure higher than the first pressure level is applied; and providing compressed air at a third pressure level when receiving a signal indicative of engine shut-down, the third pressure level being equal to or higher than the second pressure level.

9. The method according to claim 8, wherein the first air valve arrangement is arranged to be positioned in an open state at the second pressure level and the return conduit valve arrangement is arranged to be positioned in an open state at the third pressure level.

10. The method according to claim 8, wherein an air conduit valve arrangement is positioned in the air conduit upstream the nozzle; wherein the method further comprises the step of:

positioning the air conduit valve arrangement in a closed state when providing compressed air at a pressure level higher than the first pressure level.

11. The method according to claim 10, further comprising the step of:

positioning the air conduit valve arrangement in an opened state for providing compressed air to the nozzle at a pressure level corresponding at least to the first pressure level.

12. A vehicle comprising an internal combustion engine and an exhaust gas aftertreatment system arranged downstream the internal combustion engine, wherein the vehicle further comprises an arrangement according to claim 1, the arrangement being arranged to provide reducing agent to the exhaust gas aftertreatment system via the nozzle.

* * * * *